United States Patent [19]

Datta et al.

[11] 4,390,579

[45] Jun. 28, 1983

[54] DOPED POLYPHENYLENE ETHER LUBRICANT FOR HIGH DENSITY INFORMATION DISCS

[75] Inventors: Pabitra Datta, Cranbury; Eugene S. Poliniak, Willingboro, both of N.J.

[73] Assignee: RCA Corporation, New York, N.Y.

[21] Appl. No.: 389,431

[22] Filed: Jun. 17, 1982

[51] Int. Cl.$^3$ .............. B32B 3/02; G11B 3/70; G11B 5/72
[52] U.S. Cl. .............. 428/65; 428/64; 428/411; 428/408; 428/323; 428/522; 252/34.7; 252/49.6; 252/51.5 A; 252/51.5 R; 252/52 R; 346/76 L; 346/77 E; 346/135.1; 346/137; 369/275; 369/276; 369/286; 369/288
[58] Field of Search .............. 428/64, 65, 522, 411, 428/323, 408; 369/275, 276, 288, 286; 346/137, 133.1, 76 L, 77 E; 252/52 R, 51.5 R, 49.6, 34.7, 51.5 A

[56] References Cited

U.S. PATENT DOCUMENTS

| | | | |
|---|---|---|---|
| 3,833,408 | 3/1974 | Matthies | 117/217 |
| 3,842,194 | 10/1974 | Clemens | 178/6.6 A |
| 4,275,101 | 6/1981 | Wang et al. | 369/286 |
| 4,327,140 | 4/1982 | Preston | 428/65 |
| 4,330,583 | 5/1982 | Datta et al. | 428/65 |

*Primary Examiner*—Ellis P. Robinson
*Attorney, Agent, or Firm*—Birgit E. Morris

[57] ABSTRACT

High density information discs comprising a conductive carbon-loaded polyvinylchloride disc are lubricated with a polyphenylene ether containing a polar dopant substituted with a long chain alkyl group in amounts sufficient to reduce surface tension of the polyphenylene ether to enable adequate wetting of the disc surface. The successful application of this doped lubricant provides the discs with excellent lubrication, highly resistant to oxidation, moisture and shear stress.

10 Claims, No Drawings

DOPED POLYPHENYLENE ETHER LUBRICANT FOR HIGH DENSITY INFORMATION DISCS

This invention relates to high density information discs lubricated with a polyphenylene ether lubricant composition. More particularly, this invention relates to high density information discs lubricated with a polyphenylene ether lubricant containing a polar dopant.

BACKGROUND OF THE INVENTION

Clemens, in U.S. Pat. No. 3,842,194, has disclosed a system for recording and playback of information, including audio, video and color information, capacitively. A high density information disc has signal information in the form of a surface relief pattern in an information track, e.g., a spiral groove on the surface of the disc. The disc is made conductive with a metal layer, which acts as the first electrode of a capacitor, and then with a dielectric layer. The disc is played back by means of a stylus electrode which is the second electrode of the capacitor. An application of this invention is the capacitance electronic disc system. Since the disc is rotated at a fairly high speed, on the order of 450 rpm, the friction between the stylus and the disc surface may result in undue stylus wear. Thus, a lubricant is applied to the surface of the disc.

A suitable class of lubricants has been described by Matthies in U.S. Pat. No. 3,833,408, herein incorporated by reference. These lubricants have the general formula

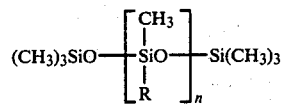

wherein R is an alkyl group of 4 to 20 carbon atoms and n is an integer.

Various improvements have been made to the disc of Clemens including a disc made from a conductive plastic which avoids the need for applying separate conductive metal and dielectric layers. Such a disc may contain conductive particles, for example, either throughout or in a surface layer. Improvement has also been made to the lubricant system. It has been found that when the lubricant is purified and fractionated, improved playback and storage stability results. The fractionated lubricant has the formula

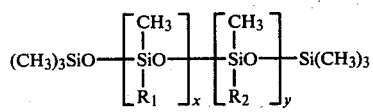

wherein $R_1$ and $R_2$ are alkyl groups of 4–20 carbon atoms, x is an integer of 2–4 and y is an integer of 0–2 and wherein the sum of x and y is 4 or less. These lubricants are described by Wang et al in U.S. Pat. No. 4,275,101, also incorporated herein by reference.

Some problems still remain for the lubricated disc. The disc surface has been found to be sensitive to moisture; that is, when the disc is exposed to ambient conditions over a period of time, particularly including conditions of high relative humidity, a thin layer of organic and inorganic water soluble salt deposits form on the surface of the disc, lifting the stylus during playback and interrupting the signal. This loss of signal has been termed "carrier distress". This carrier distress has been alleviated somewhat by careful cleaning and drying of the disc surface which removes water soluble materials that have formed on the surface during molding operations. However, with time, additional water soluble materials and external debris form on the surface of the disc, particularly in the presence of water vapor. Further, this requirement of cleaning and drying of the discs adds to the cost of manufacture. It would be desirable to eliminate this extra processing of the disc.

Thus, more recently, the fractionated methyl alkyl siloxane lubricant has been doped with various materials including hydroxylated amines and polar silicones which have improved the resistance of the disc surface to carrier distress. We have insufficient knowledge at the present time about the nature of the disc surface to predict which materials will be effective in reducing susceptability of the disc to degeneration from high temperature, high relative humidity conditions.

Polyphenylene ether (PPE) lubricants as a class have improved resistance to oxidation, moisture and shear stress. Also, they are far less expensive than the fractionated methyl alkyl siloxane lubricants currently being used. Further, although the exact mechanism of lubrication of high density information discs is not known, it is known that the surface of these discs and the polyphenylene ether lubricants are highly polar which provides excellent adhesion of these lubricants to the disc surface. However, the high surface tension of the polyphenylene ether prevents successful wetting and complete coverage of the disc surface by this lubricant. It is necessary to modify the high surface tension of the polyphenylene ether for improved wetting of the disc's surface to make the polyphenylene ether effective for high density information disc lubrication.

SUMMARY OF THE INVENTION

We have found that when polyphenylene ethers are doped with polar materials having long chain hydrocarbon groups, excellent lubrication of high density information discs is obtained and the discs maintain excellent stability to the effects of ambient atmospheric conditions.

DETAILED DESCRIPTION OF THE INVENTION

Polyphenylene ethers useful as lubricants according to the present invention have the formula

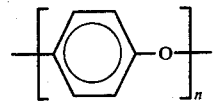

where n is an integer, preferably about 5.

The above described polyphenylene ether lubricant is combined with a polar dopant having a long chain pendant alkyl group. Suitable dopants include, for example, hydroxylated amines of the formula

wherein R$_4$ is hydrogen, lower alkyl or hydroxylalkyl; R$_5$ is R$_7$A wherein R$_7$ is an alkyl group of 1 to 5 carbon atoms and A is hydroxyl or carboxyl; R$_6$ can be R$_8$A wherein R$_8$ is a straight chain alkyl group of 1 to 10 carbon atoms and A has the meaning given above, or R$_8$—A—B—R$_9$ wherein R$_8$ and A have the meanings given above, B is a linking group which can be —O— or —C≡C— and R$_9$ is an alkyl group of 6 to 25 carbon atoms; or their corresponding quaternary ammonium salts; bis(hydroxyalalkyl)disiloxanes of the formula

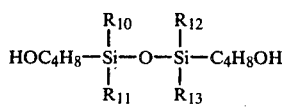

wherein R$_{10}$ and R$_{12}$ are methyl or ethyl and R$_{11}$ and R$_{13}$ are linear long chain alkyl groups of up to 20 carbon atoms, as disclosed by Wang et al in copending application Ser. No. 231,859, filed Feb. 5, 1981; or betaines of the formula

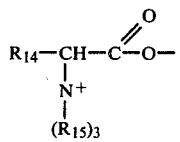

wherein R$_{14}$ is a long chain alkyl group of 6–20 carbon atoms and R$_{15}$ is hydrogen or a lower alkyl group of 1–3 carbon atoms; or betaines of the formula

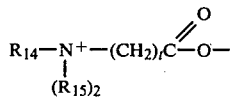

wherein R$_{14}$ and R$_{15}$ have the meanings given above and t is an integer. The above dopants are characterized by their polar nature and by the presence of long chain alkyl groups. Other dopants are also known.

It is the highly polar end groups of these dopants which adsorb to the polar polyphenylene ether so that the long hydrocarbon chain protrudes above the fluid surface. The addition of these dopants modifies the surface tension of the polyphenylene ether to provide satisfactory wetting and, thereby, excellent lubrication, of the disc surface.

The dopants can be mixed with the polyphenylene ether lubricant in a solvent mixture, for example, a heptane-isopropanol mixture, in which the components are soluble.

A suitable range for the amount of dopant to be added to the polyphenylene ether lubricant can be about 5 to 20 percent by weight. A preferred dopant concentration is about 10 percent by weight.

The solution can be sprayed onto a high density information disc in known manner, or the discs can be immersed in the solution. Alternatively, the doped lubricant can be applied directly by means of a very fine nozzle.

The lubricant system of the present invention can be applied to high density information discs as they are pressed from the mold, which is preferable, or the discs can be cleaned first with an aqueous solution. The cleaned record may be dried with a solvent such as 1,1,2-trifluoro-2,2,1-trichloroethane.

The discs have improved resistance to the effects of elevated temperatures and moisture, and the lubrication is sufficient to prevent undue stylus wear.

The invention will be further illustrated by the following Examples, but the invention is not meant to be limited to the details described therein. In the Examples, parts and percentages are by weight unless otherwise noted.

Carrier distress time is measured by adding the amount of time in seconds (but discounting intervals of less than 10 microseconds) during record playback when the r.f. output of the player arm is less than 150 millivolts peak to peak and the time when the r.f. output gives above 8.6 or below 3.1 megahertz in frequency, indicating a defect. Such defects are noted by the viewer as dropouts. The present acceptable level of carrier distress for a high density information disc is three seconds in one hour of playback time.

EXAMPLE 1

A molding composition was prepared by mixing 78 parts of Geon 110×346 polyvinylchloride of the B. F. Goodrich Company; 13 parts of Ketjenblack EC carbon black of the Armak Company; 1.5 parts of dibutyltin-β-mercaptopropionate commercially available as T-35 from M & T Chemical Company; 1.0 part of Mark 275 stabilizer of the Argus Chemical Company, a dibutyltin meleate stabilizer; 2.0 parts of Acryloid K-147 and 0.75 part of Acryloid K-175, acrylic modifiers of Rohm & Haas Company; 0.5 part of Loxiol G-30 and 0.25 part of Loxiol G-70 lubricants of Henkel International GmbH; 1.0 part of calcium stearate and 2.0 parts of diundecyl phthalate.

High density information discs were compression molded from the above composition at about 360° F. (182.2° C.). A solution was made of 0.3 percent polyphenylene ether available as PPE from NYE Inc. and 0.03 percent of a quaternary ammonium salt of a hydroxylated amine of the formula

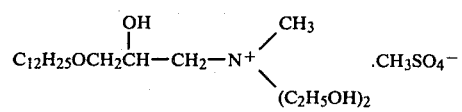

in a 80:20 mixture of heptane and isopropanol. The above described video discs were spray coated with the solution.

Control discs were lubricated with the standard fractionated methyl alkyl siloxane lubricant of the formula

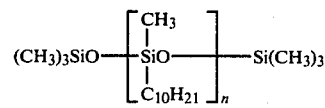

molecularly distilled at 205° C.

The results of carrier distress on initial playback and after stressing for one hour in a chamber maintained at 100° F. and 95 percent relative humidity are given below in Table I.

TABLE I

| | Initial Play | | | After Stress | | |
|---|---|---|---|---|---|---|
| | Median | Range | # Pass | Median | Range | # Pass |
| Control | 0 | 0-0 | 6/6 | 15 | 9.2-48 | 0/6 |

TABLE I-continued

| | Initial Play | | | After Stress | | |
|---|---|---|---|---|---|---|
| | Median | Range | # Pass | Median | Range | # Pass |
| Ex. 1 | 0 | 0–0 | 6/6 | 0.2 | 0–4.7 | 5/6 | where the carrier distress data is given in seconds for 30 minutes of playback time.

COMPARATIVE EXAMPLE 1

This example illustrates that the polyphenylene ether lubricant alone does not properly lubricate the disc. The procedure of Example 1 was followed except that the discs were sprayed with a 0.3 percent solution of polyphenylene ether alone. The results are given below in Table II.

TABLE II

| | Initial Play | | | After Stress | | |
|---|---|---|---|---|---|---|
| | Median | Range | # Pass | Median | Range | # Pass |
| Comp. Ex. 1 | 0 | 0–0.1 | 6/6 | 9.3 | 5.4–28 | 0/6 |

EXAMPLE 2

The procedure of Example 1 was followed, except using a solution of polyphenylene ether containing 0.03 percent of a dopant of the formula

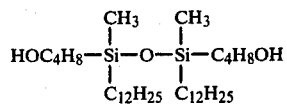

The playback data are summarized below in Table III.

TABLE III

| | Initial Play | | | After Stress | | |
|---|---|---|---|---|---|---|
| | Median | Range | # Pass | Median | Range | # Pass |
| Ex. 2 | 0 | 0–0 | 6/6 | 1.1 | 0–8.2 | 4/5 |

EXAMPLE 3

The procedure of Example 1 was followed using a solution of polyphenylene ether containing 0.03 percent of cetyl betaine. The playback data are summarized below in Table IV.

TABLE IV

| | Initial Play | | | After Stress | | |
|---|---|---|---|---|---|---|
| | Median | Range | # Pass | Median | Range | # Pass |
| Ex. 3 | 0 | 0–0.1 | 6/6 | 0.2 | 0–0.8 | 6/6 |

EXAMPLE 4

In this example, the discs were made as in Example 1 except that a carbon black of the Cabot Corporation, CSX-175B, was employed. The playback data for discs pressed from this compound and lubricated with the standard fractionated methyl alkyl siloxane as above (Control) and a polyphenylene ether containing 10 percent by weight of the dopant of Example 1 is given below in Table V.

TABLE V

| | Initial Play | | | After Stress | | |
|---|---|---|---|---|---|---|
| | Median | Range | # Pass | Median | Range | # Pass |
| Control | 0 | 0–0 | 6/6 | 21 | 9.2–48 | 0/6 |
| Ex. 4 | 0 | 0–0 | 6/6 | 0.4 | 0–3.5 | 5/6 |

EXAMPLE 5

This example illustrates that mixtures of more than one polar dopant can also be employed with the polyphenylene ether lubricant of the invention.

In this example the disc composition is the same as in Example 4. Polyphenylene ether was mixed for Sample A with 0.03 percent of the dopant of Example 3 and 0.03 percent of the dopant of Example 2. For Sample B, polyphenylene ether was mixed with 0.03 percent of the dopant from Example 1 and 0.03 percent of the dopant from Example 2. The playback data are summarized below in Table VI.

TABLE VI

| | Initial Play | | | After Stress | | |
|---|---|---|---|---|---|---|
| | Median | Range | # Pass | Median | Range | # Pass |
| Ex. 5A | 0 | 0–0 | 6/6 | 0.3 | 0–0.5 | 6/6 |
| Ex. 5B | 0 | 0–0 | 6/6 | 0.2 | 0–0.7 | 6/6 |

EXAMPLE 6

This example illustrates the modification of the high surface tension of polyphenylene ether by the polar dopants. The surface tensions of the described lubricants were measured using a Fischer Surface Tensiometer Model-20 at room temperature (21° C.). Table I summarizes the results.

(Note—The critical surface tension for an as pressed video disc is about 32±2 dynes/cm.)

TABLE VII

| Lubricant | Surface Tension, dynes/cm. |
|---|---|
| Polyphenylene ether (PPE) | 45 ± 2 |
| PPE + 10% Dopant of Ex. 1 | 30 ± 2 |
| PPE + 15% Dopant of Ex. 2 | 29 ± 2 |
| PPE + 10% Dopant of Ex. 3 | 32 ± 3 |

Considering the critical surface tension of the video disc, the PPE in its pure form is obviously incapable of wetting the surface properly. The reduction of the surface tension by each of the polar lubricants has enabled the PPE to serve as an excellent lubricant as demonstrated in Examples 1–5.

We claim:

1. In a high density information disc adapted for use with a playback stylus to effect recovery of signals occupying a bandwidth of at least several megahertz when relative motion at a desired rate is established between said disc and said stylus, said disc comprising a disc whose surface is conductive and has an information track therein constituted by a surface relief pattern in said track to accommodate recovery of signals of said bandwidth upon establishment of relative motion at said rate, said disc coated with a lubricant, the improvement comprising utilizing a lubricant of the formula

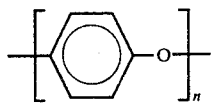

wherein n is an integer, said lubricant containing one or more polar dopants substituted with a long chain alkyl group.

2. A disc according to claim 1 where n is equal to 5.

3. A disc according to claim 1 wherein said dopant has the formula

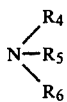

wherein $R_4$ is hydrogen, lower alkyl or hydroxylalkyl; $R_5$ is $R_7A$, wherein $R_7$ is an alkyl group of 1 to 5 carbon atoms and A is hydroxyl or carboxyl; $R_6$ can be $R_8A$ wherein $R_8$ is a straight chain alkyl group of 1 to 10 carbon atoms, and A has the meaning given above or can be $R_8A$—B—$R_9$ wherein $R_8$ and A have the meanings given above, B is a linking group which can be —O— or —C≡C— and $R_9$ is an alkyl group from 6 to 25 carbon atoms; or a quaternary ammonium salt thereof.

4. A disc according to claim 1 wherein said dopant has the formula

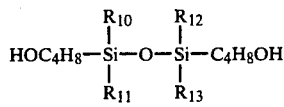

wherein $R_{10}$ and $R_{12}$ can be methyl or ethyl and $R_{11}$ and $R_{13}$ are linear long chain alkyl groups of up to 20 carbon atoms.

5. A disc according to claim 1 wherein said dopant has the formula

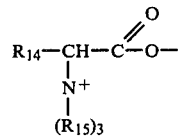

wherein $R_{14}$ is a long chain alkyl group of 6–20 carbon atoms and $R_{15}$ is hydrogen or a lower alkyl group of 1–3 carbon atoms.

6. A disc according to claim 1 wherein from about 5 to 20 percent by weight of the dopant based on the amount of lubricant is present.

7. A disc according to claim 1 wherein about 10 percent by weight of the dopant based on the amount of lubricant is present.

8. A disc according to claim 1 wherein said disc is made of a conductive carbon-containing polymer or copolymer of polyvinylchloride.

9. A disc according to claim 3 wherein the dopant is a corresponding quaternary ammonium salt having the formula

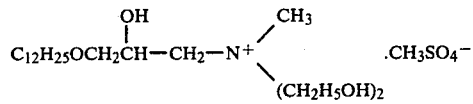

10. A disc according to claim 5 wherein the dopant has the formula

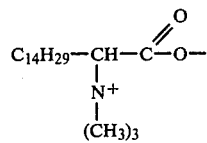

* * * * *